March 8, 1960  L. F. GLAUDE  2,927,484
SAW FILING APPARATUS
Filed March 6, 1959
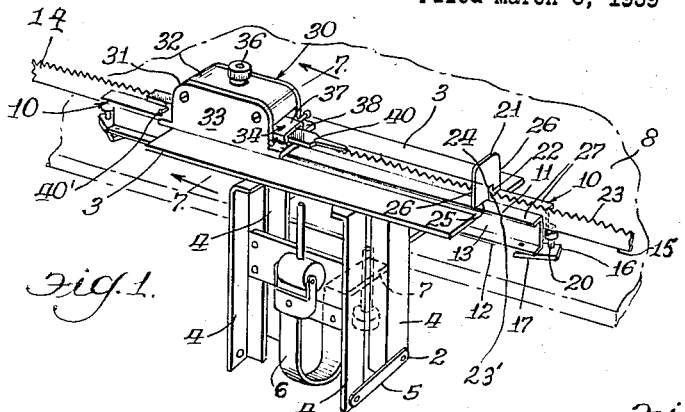
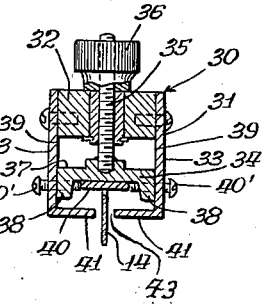
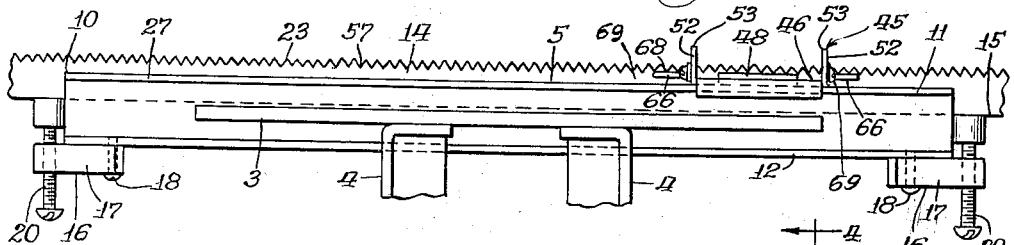
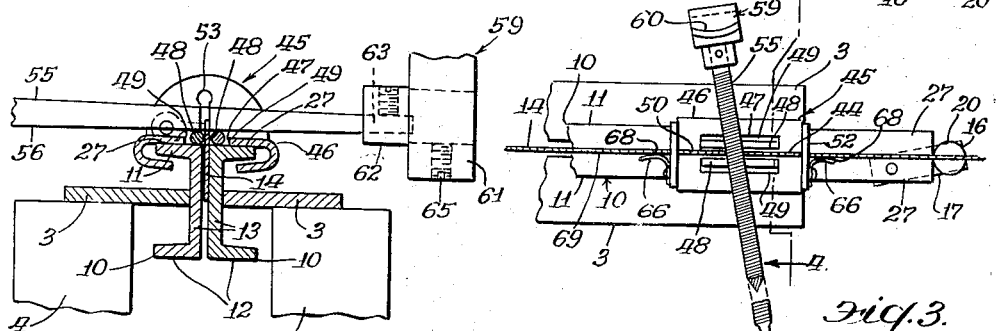
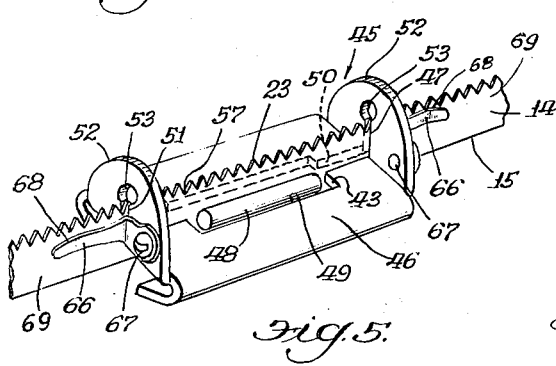
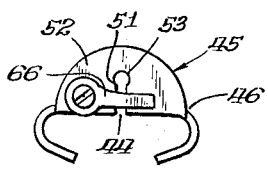
INVENTOR.
Leopold F. Glaude
BY Richard J. Myers
and
John J. Kowalik
Attys.

2,927,484

SAW FILING APPARATUS

Leopold F. Glaude, Chicago, Ill.

Application March 6, 1959, Serial No. 797,745

5 Claims. (Cl. 76—36)

This invention relates to saw filing apparatus and more specifically to novel mechanism for gauging and evening the teeth and guiding the filing of the teeth.

A general object of the invention is to provide a novel saw filing assembly which is quickly and accurately adjustable and which is flexible in use.

A further object is to devise a novel jointing jig which incorporates a pair of laterally spaced vertical guides which admit the saw blade therebetween and seat on the clamp jaws which hold the saw, said guides also guiding file holder which is adjustably mounted from a top wall interconnecting the guides.

A further object is to devise a novel file depth guide which includes a sliding carriage movable lengthwise of the saw in guided engagement therewith and with the clamping jaws of the vise holding the saw, the guide loosely mounting depth limiting rollers which ride upon the jaws and serve as stops for the file when it reaches the bottom of the gullet between the teeth of the saw.

Another object of the invention is to provide a file guide in which the rollers are freely movable upon engagement by the file to minimize wear and wherein the rollers are supported directly upon the jaws of the saw holding clamp and ride thereupon whereby any wear taking place is minimized.

A different object is to provide a novel carriage which is yieldably interlocked with the saw.

A still further object is to provide a novel thumb holder for the file which is adjustable easily and quickly to position the file at different angles.

These and other objects of the invention will become more apparent from the specifications and the drawings, wherein:

Figure 1 is a perspective view of saw holding, gauging and jointing apparatus;

Figure 2 is an enlarged fragmentary side elevational view of the clamp, saw and file holder;

Figure 3 is a fragmentary top plan view of the structure shown in Figure 2 with a file applied thereto;

Figure 4 is enlarged transverse vertical sectional view of Figure 3 taken substantially on line 4—4 of Figure 3;

Figure 5 is an enlarged perspective view of the file guide and blade on which it is mounted;

Figure 6 is an end view of the file guide approximately on the scale of Figure 5; and Figure 7 is an enlarged transverse sectional view of Figure 1 taken substantially on line 7—7 of Figure 1.

Describing the invention in detail and having particular reference to the drawings, there is shown a clamp 2 of the type having a pair of jaw members 3, 3 which are mounted on the upper ends of the arms 4, 4 which are pivotally interconnected at their lower ends by links 5, 5 and actuated into clamping engagement by a resilient U-shaped cam actuated lock 6, the clamp being supported by a jaw 7 from a bench or the like 8. The jaws 3 embrace a pair of channel shaped holders 10, 10 which are provided with top and bottom horizontal webs 11 and 12 and an upstanding wall 13 which embrace a saw blade 14 therebetween.

The blade rests on its bottom edge 15 on leveling means 16 at opposite ends of holders 10, each leveling means comprising a swinging arm 17 pivoted at its inner end as by a screw 18 to the bottom web 12 of the related holder 10 and the outer end of the arm having a vertical adjusting screw 20 which is underposed with respect to the blade.

The height of the blade is governed by the gauge 22 which has a slot 23' therein admitting the saw blade which has its teeth 23 abutting the upper edge 24 of the slot while the lower edges 25 of the legs 26 of the gauge rest upon the upper gauge surfaces 27 provided on the top sides of the webs 11 of the holders 10.

In preparing the saw for filing, a jointer 30 is used to even the teeth 23, the jointer comprising a body 31 including a transverse top wall 32 and dependent side walls or guides 33 which embrace the mounting block 34, the block 34 being carried on the lower end of a screw 35 which threads through a nut 36 being rotatably mounted on the wall 32.

The block 34 is an inverted U-shaped member having a horizontal top wall 37 and dependent flanges 38 which are complementally engaged with the flat interior surfaces 39 of the upright side members 33 for vertical movement therebetween, the flanges 38 carrying a flat file 40 therebetween by set screws 40' which are threaded through the flanges 38 and engage the edges of the file and hold it against the underside of the top wall 37. The guides 33 terminate in inturned flanges 41 which engage the top sides 27 of walls 11 of the holders and define a saw admitting slot 43.

After jointing, the teeth are filed. In order to secure the proper depth and angle the carriage 45 is sleeved over the holders, said carriage comprising a base plate 46 which seats on top of the webs 11 of the holders 10 and at its lateral edges is provided with inturned flanges which hook under the respective webs 11. The plate 46 is apertured centrally thereof to provide an elongated rectangular slot 47 within which are disposed a pair of rollers 48 which flank the saw blade. The slot portions at opposite sides of the blade are large enough transversely of the blade to permit considerable movement for the rollers between the blade and the edges 49, the rollers rolling upon the top surfaces 42 of the webs 11 of holders 10. The slot 47 is narrowed at each end 50 to closely guide on the blade and each slot end 50 leads into an upright portion 51 in a transverse vertical upright end wall 52 of the carriage, each slot portion 51 terminating in a rounded upper edge 53. The walls 52 are approximately semi-cylindrical to accommodate maximum angular movement of the triangular file 55 which is positioned with its edge 56 in the trough 57 and held at the required angle by the operator holding the handle 58 with one hand and the thumb rest 59 with the other hand. In order to control circumferential positioning of the file, the thumb rest comprises an upstanding thumb rest portion 60 which at its lower end is provided with a socket portion 61 into which is fitted a complementary file holding chuck 62 which admits one end 63 of the file which is held therein by a set screw and the chuck portion 62 being held in socket 61 by set screw 65.

In operation the filing proceeds along the saw and as the file bottoms it rides upon the rollers which because of the enlarged slot portion 47 roll transversely of the blade. In this connection it will be seen that the end walls 52 are provided with leaf springs 66 which are anchored at one end by bolts 67 threaded into the wall 52 and the other end of the spring bearing as at 68 against a side 69 of the blade. It will be seen that as the roller 48 on the handle side of the file is brought against the blade the other roller moves away from the blade and abuts the far edge 49 and further movement flexes the springs 66 which moves the carriage thus alerting the operator that he has bottomed. The yielding action also minimizes abrading or cutting of the rollers and the shifting of the rollers along the surfaces 27 insures that the proper level is maintained and that the bearing surfaces are not worn because the surface areas 27 are constantly changed as the carriage is moved along the length of the holder.

I claim:

1. In a device of the class described a clamp having a pair of clamping portions with generally horizontal oppositely extending webs presenting upper guide surfaces, a saw blade clamped between said portions and having upwardly directed teeth, a carrier having a base astride said surfaces and inturned flanges on the base extending under said webs, said base having a slot at opposite sides of the blade open to respective surfaces, and a file guide roller loosely mounted in each slot and having rolling contact with the respective surface for movement toward and away from the blade upon engagement by a file cutting said teeth.

2. The invention according to claim 1 and resilient means mounted on the carrier and reactively engaged with the blade for releasably holding the carrier in operative association with the blade.

3. In a device of the class described, the combination of a clamp having a pair of opposed portions presenting upwardly facing planar guide surfaces, a saw blade with upwardly directed teeth clamped between said portions, a jointer having a body portion straddling said saw and including a pair of guide members flanking the saw and having lower edges riding upon respective surfaces, mounting means carried by the body, and a file adjustably mounted on said mounting means between said members.

4. The invention according to claim 3 and said mounting means including an inverted U-shaped element including a top web and dependent flanges in slidable engagement with respective members for vertical movement therebetween, an adjusting screw connected to said web and a portion of said body thereabove for adjusting the vertical height of said member, and said file pocketed on the underside of said member in filing relation to the teeth.

5. The combination of a clamp having a pair of opposed portions, a saw blade clamped therebetween and having upwardly directed teeth and a lower edge, and leveling means on each portion comprising an arm pivoted at one end to the associated portion on an axis accommodating swinging movement of the arm toward and away with respect to the blade and a screw mounted leveling block on the arm positionable beneath the blade in engagement with said lower edge.

References Cited in the file of this patent

UNITED STATES PATENTS

| | | |
|---|---|---|
| 1,003,904 | Higbee | Sept. 19, 1911 |
| 2,171,169 | Woodbury | Aug. 29, 1939 |
| 2,420,468 | De Walt | May 13, 1947 |
| 2,662,433 | Greenlee | Dec. 15, 1953 |
| 2,677,289 | Fitch | May 4, 1954 |